(12) United States Patent
Goodman et al.

(10) Patent No.: US 9,380,102 B2
(45) Date of Patent: Jun. 28, 2016

(54) SECURE MANAGEMENT OF SIP USER CREDENTIALS

(75) Inventors: Lee N. Goodman, Tyngsboro, MA (US); Elliot G. Eichen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 565 days.

(21) Appl. No.: 13/038,408

(22) Filed: Mar. 2, 2011

(65) Prior Publication Data

US 2012/0226815 A1 Sep. 6, 2012

(51) Int. Cl.
*H04L 29/06* (2006.01)
*H04L 12/24* (2006.01)

(52) U.S. Cl.
CPC ............ *H04L 65/80* (2013.01); *H04L 41/0672* (2013.01); *H04L 65/1006* (2013.01); *H04L 63/062* (2013.01); *H04L 63/083* (2013.01)

(58) Field of Classification Search
CPC . H04L 65/80; H04L 65/1006; H04L 41/0672; H04L 63/083; H04L 63/062
See application file for complete search history.

(56) References Cited

U.S. PATENT DOCUMENTS

| | | | |
|---|---|---|---|
| 8,160,567 B2* | 4/2012 | Opaluch | 455/420 |
| 2001/0013088 A1* | 8/2001 | Matsumoto | 711/135 |
| 2002/0024943 A1* | 2/2002 | Karaul et al. | 370/338 |
| 2002/0146005 A1* | 10/2002 | Gallant et al. | 370/389 |
| 2004/0161083 A1* | 8/2004 | Crockett et al. | 379/93.23 |
| 2006/0236083 A1* | 10/2006 | Fritsch et al. | 713/1 |
| 2006/0291454 A1* | 12/2006 | Ali | 370/352 |
| 2007/0209067 A1* | 9/2007 | Fogel | 726/11 |
| 2007/0257104 A1* | 11/2007 | Owen et al. | 235/380 |
| 2007/0297610 A1* | 12/2007 | Chen et al. | 380/270 |
| 2008/0280591 A1* | 11/2008 | Opaluch | 455/410 |
| 2009/0003533 A1* | 1/2009 | Appiah et al. | 379/1.01 |
| 2010/0150136 A1* | 6/2010 | Houle et al. | 370/352 |
| 2010/0319059 A1* | 12/2010 | Agarwal et al. | 726/7 |

* cited by examiner

*Primary Examiner* — Joe Chacko

(57) ABSTRACT

A device may obtain, from a remote device on a network, information regarding loads and Session Initiation Protocol (SIP) devices on which the loads are installed. In addition, the device may access a database storing load compatibility information, identify problematic loads based on the obtained information and the load compatibility information, determine fixes for one or more of the problematic loads, and apply the fixes to the one or more of the problematic loads over the network.

19 Claims, 9 Drawing Sheets

SECURE MANAGEMENT OF SIP USER CREDENTIALS

BACKGROUND INFORMATION

Some Voice-over-Internet-Protocol (VoIP) devices are constructed to appear and operate similar to Plain Old Telephone System (POTS) telephones that are interconnected via Public Switched Telephone Network (PSTN). Other VoIP devices are computers with VoIP communication programs that communicate over an Internet Protocol (IP) packet based network.

DETAILED DESCRIPTION OF PREFERRED EMBODIMENTS

The following detailed description refers to the accompanying drawings. The same reference numbers in different drawings may identify the same or similar elements.

Figure 1A:
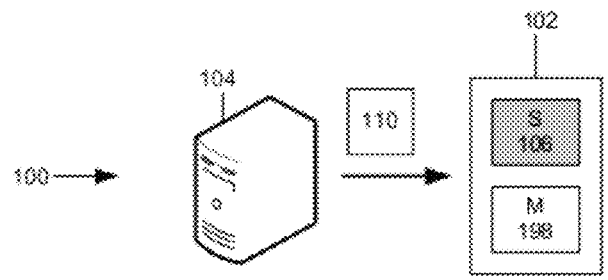
FIGS. 1A and 1B illustrate concepts described herein.
Figure 1B:
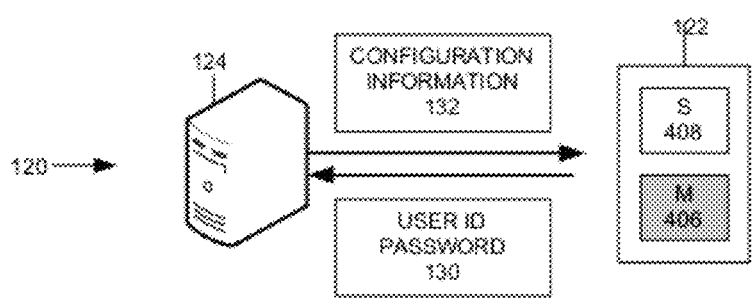

As described herein, a system may allow a user device to securely manage Session Initiation Protocol (SIP) user credentials. FIGS. 1A and 1B illustrate an example of the concept. FIG. 1A illustrates a configuration process 100. As shown, configuration process 100 is associated with a user device 102 and a SIP credentials server device 104. User device 102 (e.g., Internet Protocol (IP) phone) may be used for communication (e.g., place a call). As shown, user device 102 includes a storage medium 106 and a memory 108. SIP credentials server device 104 provides configuration file to user devices. A configuration file may include SIP user credentials in addition to other pieces of information. A configuration file may be encrypted.

In FIG. 1A, during configuration process 100, user device 102 communicates with SIP credentials server device 104 and downloads a configuration file 110, over a secure channel (e.g., encrypted channel), from device 104. User device 102 then stores file 110, as indicated by the shading on storage medium 106 in user device 106. User device 102 decrypts file 110 with a decryption key to use the decrypted file to configure one or more components (e.g., SIP client application) on user device 102.

Configuration process 100 may pose a number of security issues. For example, the configuration file, which includes customer information, is on storage medium 106. If user device 102 is lost or stolen, the file may be hacked. In another example, the decryption key on user device 102 may be hacked. To safeguard against such a possibility, user device 102 may be provided with, for example, a rotating key. However, a rotating key system is prone to failure, as a rotating key may become out-of-sync with other components of the system.

FIG. 1B illustrates a SIP credentials management process 120 that is associated with a user device 122 and SIP credentials server device 124. User device 122 may be used for communication. As shown, user device 122 includes a memory 406 and a storage unit 408. SIP credentials server device 124 provides SIP user credentials to user devices. The SIP user credentials may be in an encrypted form.

In FIG. 1B, during SIP credentials management process 120, user device 122 sends a user identifier (ID) and a password to SIP credentials server device 124, requesting SIP user credentials. In response, SIP credentials server device 124 sends encrypted SIP user credentials 132 to user device 122 over a secure channel. User device 122 caches the SIP user credentials in memory 406, as indicated by the shading. Subsequently, user device 122 decrypts the cached information with a decryption key and uses the decrypted information (e.g., to configure a component, render a SIP service, etc.).

In process 120, because SIP user credentials are stored in memory 406 and not in storage unit 408, if user device 122 shuts off, or if a user device 122's SIP client application that uses the SIP user credentials exits, quits, or is terminated, SIP user credentials vanishes from user device 122. This provides for increased security.

Figure 2:
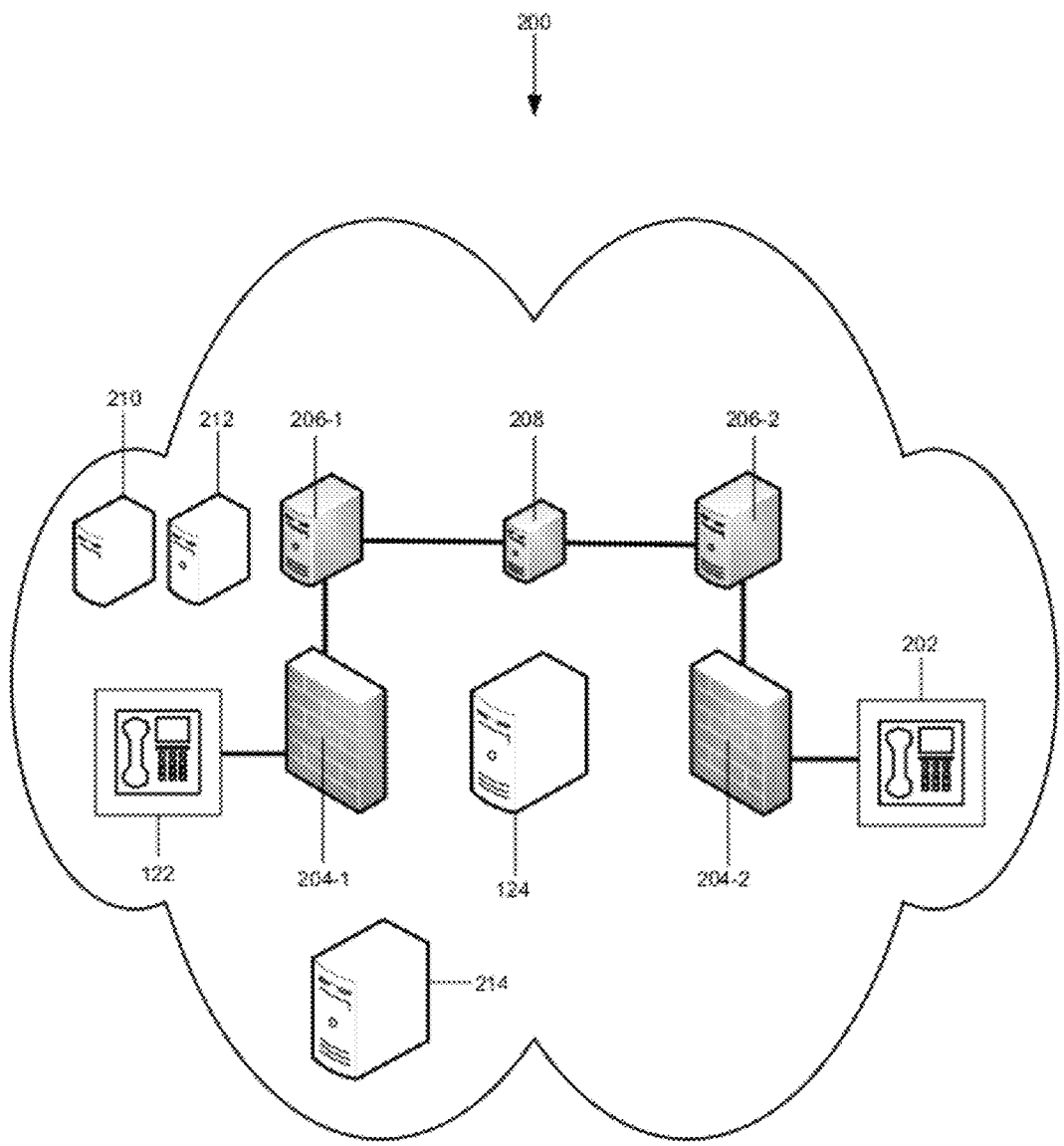
FIG. 2 is a diagram of an exemplary network in which the concepts described herein may be implemented.

FIG. 2 shows an exemplary network 200 in which concepts described herein may be implemented. Typically, network 200 may include one or more wired and/or wireless networks that are capable of exchanging information, such as voice, video, documents, multimedia, text, etc. For example, network 200 may include one or more public switched telephone networks (PSTNs) or another type of switched network. Network 200 may also include one or more wireless networks and may include a number of transmission towers for receiving wireless signals and forwarding the wireless signals toward the intended destination. Network 200 may further include one or more packet switched networks, such as an IP based network, a local area network (LAN), a wide area network (WAN), a personal area network (PAN), an intranet, the Internet, or another type of network that is capable of exchanging information.

As shown in FIG. 2, network 200 may include user devices 122 and 202 (herein collectively referred to as user devices 122 and individually as user device 122), router/firewall devices 204-1 and 204-2 (collectively router/firewall devices 204 and individually router/firewall device 204), session border controller (SBC) devices 206-1 and 206-2 (collectively SBC devices 206 and individually SBC device 206), a proxy server device 208, a registration device 210, a location server device 212, SIP credentials server device 124, and client applications provider device 214.

For simplicity, FIG. 2 does not show other network components, such as switches, bridges, etc. or all interconnections (e.g., connections between registration device 210 and other devices). In addition, depending on the implementation, network 200 may include fewer, additional, or different devices than those illustrated in FIG. 2. For example, in one implementation, network 200 may include additional SBC devices, proxy server devices, registration devices, location servers, a redirect server (not shown), etc. In another example, in some implementations, the functionalities of both registration device 210 and location server device 212 may be combined in a single device.

User device 122 may include software/hardware components to operate as an IP/VoIP telephone or soft phone. User device 122 may include a device specifically designed to operate exclusively as a VoIP/IP telephone (e.g., a Cisco IP phones, Polycom IP phones, etc.) and/or any of the following devices that have the ability to or are adapted to operate as an VoIP/IP telephone, such as, for example, a mobile telephone with an VoIP/IP communication capability, a smart phone, a table computer, a personal digital assistant (PDA) or electronic notepad with an VoIP/IP software application, a networked laptop computer or personal computer (PC), a VoIP/IP Integrated Access Device (IAD) that allows a POTS telephone plugged into the VoIP/IP IAD to communicate over a packet switched network in accordance with the SIP, etc.

Router/firewall device 204 may include mechanisms for routing packets, modifying network addresses of packets (e.g., network address translation (NAT)), and for protecting devices in network 200 against unauthorized egress/ingress. In some implementations, router/firewall device 204 may receive SIP user credentials (e.g., user ID and password) from user device 122 before router/firewall device 200 allows user device 122 to communicate with another device outside router/firewall device 204.

SBC device 206 may provide for signaling as well as a set up, maintenance, and/or tear down of media channels, such as VoIP sessions, video streams, instant messaging sessions, etc. Proxy server device 208 may include an entity (e.g., a device, an application, etc.) that operates on behalf of another entity, such as user device 122. In acting on behalf of another, proxy server device 208 may route VoIP/IP signaling messages toward their destinations.

Registration device 210 may include a device for registering a user and storing the registration information at location server device 212. The registration may include receiving SIP user credentials (e.g., a user ID and password that user device 122 receives from SIP credentials server device 124), binding information (e.g., an association) between an address of record (AOR) (e.g., a uniform resource identifier (URI)) and a network address (e.g., an IP address). Upon successfully authenticating a user of user device 122, registration device 210 may store the binding information at location server device 212. To initiate the registration, client device 202 may issue a SIP REGISTER command along with the SIP authentication/binding information to registration device 210.

Location server device 212 may include a device at which registration device 210 stores the bindings and the client device information. Other devices in network 200, such as proxy server device 208, user device 202, etc., may obtain the binding information and/or client device information from location server device 212. For instance, proxy server device 208 may obtain an IP address of user device 122 from location server device 212, in order to initiate a communication session between SIP applications on client devices 122 and 202.

SIP credentials server device 124 may provide SIP user credentials to user devices 122. pr other types of information (e.g., SIP client application configuration information) that includes SIP user credentials to user devices 122. When SIP credentials server receives a request for information from a client application on user device 122, SIP credentials server device 124 may use a user ID and a password in the request to authenticate the user. If the authentication is successful, SIP credentials server device 124 may retrieve and/or generate the requested information. Furthermore, if the retrieved/generated information is not encrypted, SIP credentials server device 124 may encrypt the information, for example, using a key (e.g., a rotating key, public key, etc.). Thereafter, SIP credentials server device 124 may send the encrypted information, over a secure communication channel, to user device 122.

Client applications server device 214 may provide a client application to user device 122. When client applications server device 214 receives a request for a client application from, for example, a browser, client applications server device 214 may send the client application to user device 122. Upon receipt of user's authorization, user device 214 may install the client application. The client application is described below in greater detail with reference to FIG. 5.

Figures 3A, 3B:
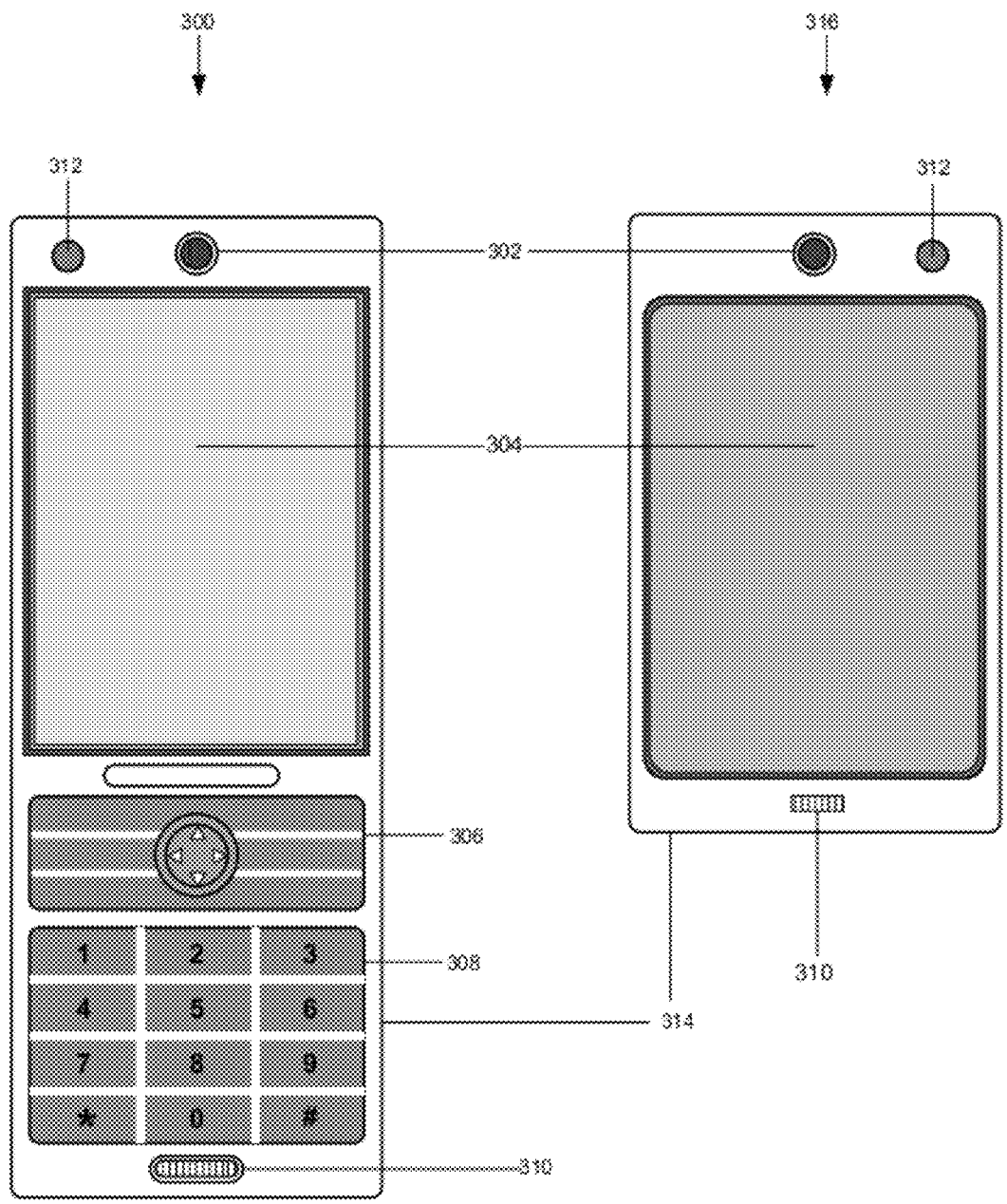
FIG. 3A is a diagram illustrating a user device of FIG. 1B according to one exemplary implementation.
FIG. 3B is a diagram illustrating the user device of FIG. 1B according to another exemplary implementation.

FIG. 3A is a diagram of device 122 according one exemplary embodiment 300. In this embodiment, device 300 is in the form of a portable phone (e.g., a cell phone). As shown in FIG. 3A, device 300 includes a speaker 302, display 304, control buttons 306, keypad 308, microphone 310, sensor 312, and housing 314.

Speaker 302 may provide audible information to a user of device 300. Display 304 may provide visual information to the user, such as an image of a caller, video images, text, pictures, etc. Control buttons 306 permit the user to interact with device 300 to cause device 300 to perform one or more operations, such as place or receive a telephone call. Keypad 308 may include a standard telephone keypad.

Microphone 310 may receive audible information from the user. Sensors 312 may collect and provide, to device 300, information (e.g., ambient light intensity, acoustic information, infrared information, etc.) that may be used to aid the user in capturing images. Housing 314 provides a casing for components of 300 and may protect the components from outside elements. Although not illustrated in FIG. 3A, device 300 may include additional, fewer, or different components, such as a flash, a camera lens assembly (e.g., a set of zoom lens), etc.

FIG. 3B is a diagram of device 122 according to another exemplary embodiment 316. In FIG. 3B, components that correspond to those in FIG. 3A are labeled with the same numbers. In contrast to device 300, device 316 may provide display 318 that includes a touch screen and a graphical user interface that replaces some of input/output components in device 300, such as control buttons 306 or keypad 308.

Figure 4:
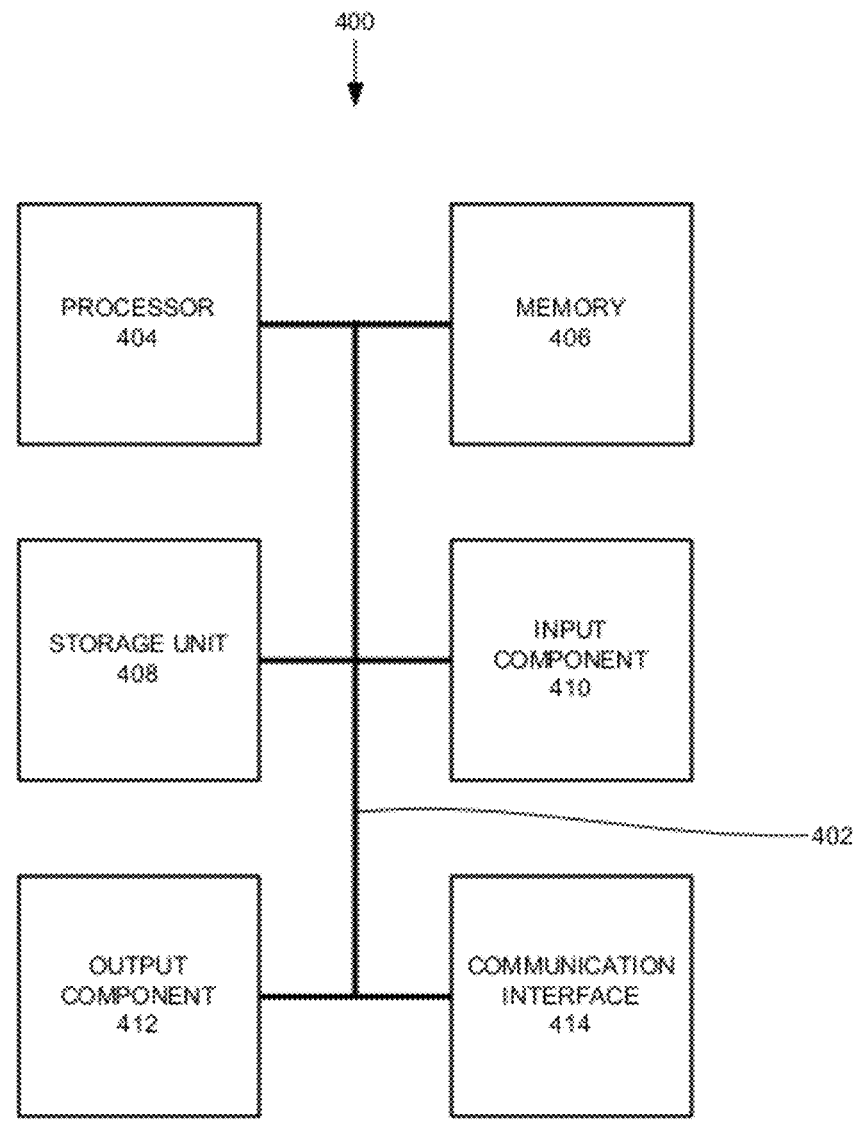
FIG. 4 is a block diagram of exemplary components of a network device of FIG. 2.

FIG. 4 is a block diagram of exemplary components of a network device 400. Network device 400 may correspond to one or more of devices 122, 204, 206, 208, 210, 212, 124, and 214, in FIG. 2. Referring to FIG. 4, network device 400 may include a bus 402, processor 404, memory 406, storage unit 408, input component 410, output component 412, and communication interface 414. Bus 402 may include a path that permits communication among the elements of network device 400.

Processor 404 may include a processor, a microprocessor, an Application Specific Integrated Circuit (ASIC), a Field Programmable Gate Array (FPGA), and/or other processing logic (e.g., embedded devices) capable of controlling network device 400, processing data (e.g., incoming frames, etc.). Memory 406 may include static memory, such as read only memory (ROM), and/or dynamic memory, such as random access memory (RAM) and content addressable memory (CAM), or onboard cache, for storing data and machine-readable instructions (e.g., programs, scripts, etc.).

Storage unit 408 may include a floppy disk, CD ROM, CD read/write (R/W) disc, and/or flash memory, as well as other types of storage devices (e.g., hard disk drive) for storing data and/or machine-readable instructions (e.g., a program, script, etc.). Depending on the context, the term "memory," "storage," "storage device," and/or "storage unit" may be used interchangeably. For example, a "computer-readable storage device" or "computer readable medium" may refer to a memory and/or storage device.

Input component 410 may permit a user to input information to network device 400. Input component 410 may include, for example, a keyboard, a keypad, a mouse, a pen, a microphone, a touch screen, voice recognition and/or biometric mechanisms, etc. Output component 412 may include a mechanism that outputs information to the user. Output component 412 may include, for example, a display, a printer, a speaker, etc. In some implementations, because network device 400 may operate as a server device, network device 400 may include a minimal number of input components 410 and output components 412 (e.g., a keyboard and/or a console), to minimize cost and to increase robustness.

Communication interface 414 may include a transceiver (e.g., a transmitter or receiver) for network device 400 to communicate with other devices and/or systems. For example, via communication interface 414, network device 400 may communicate over a network, such as the Internet, an intranet, a terrestrial wireless network (e.g., a WLAN, WiFi, WiMax, etc.), a satellite-based network, optical network, etc. Communication interface 414 may also include a modem, an Ethernet interface to a LAN, and/or another interface.

In FIG. 4, network device 400 is illustrated as including components 402-414 for simplicity. In an actual implementation, network device 400 may include additional, fewer, or different components. For example, network device 400 may include one or more power supplies, fans, motherboards, video cards, etc.

Figure 5:
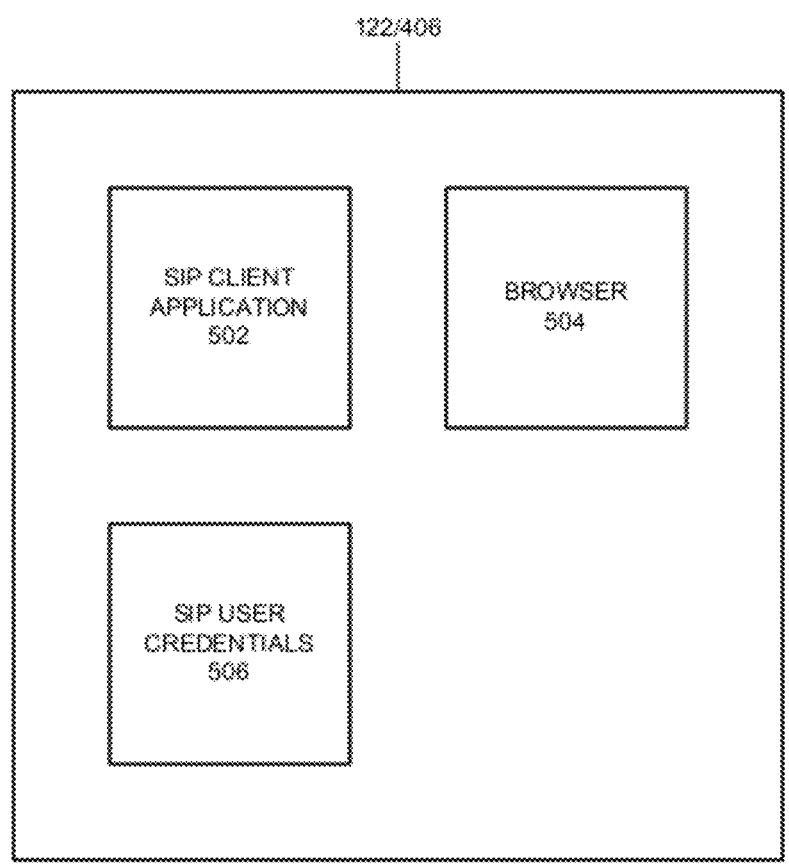
FIG. 5 is a block diagram of exemplary functional components of the memory of the user device of FIG. 2.

FIG. 5 is a block diagram of exemplary functional component of memory 406 in user device 122. As shown, memory 406 in user device 122 may include a SIP client application 502, a browser 504, and SIP user credentials 506. Storage unit 408 of user device 122 may also include persistent versions of SIP client application 502 and browser 504.

SIP client application 502 may communicate with another SIP client application over network 200. Via SIP client application 502, a user may place a call, receive a call, send text messages, etc. In some implementations, SIP client application 502 may be downloaded from another device, such as client applications server device 214, and installed on user device 122.

After its installation and before SIP client application 502 can render SIP services for a user, however, SIP client application 502 or another program/software component (all of which are referred to as SIP client application 502 for simplicity) may perform a SIP service configuration. To initiate the SIP service configuration, SIP client application 502 may prompt the user for a user ID and a password, to initiate the self-configuration. Thereafter, SIP client application 502 may access a server site (e.g., a site at SIP credentials server device 124) from which encrypted configuration information may be downloaded and decrypted.

In addition to performing the configuration, SIP client application 502 may use SIP user credentials in the information to register itself at registration device 210. After a successful registration, SIP client application 502 may provide SIP services to the user (e.g., place a call, receive a call, receive incoming text messages, etc.

In some implementations, SIP client application 502 may obtain SIP user credentials 506 from SIP credentials server device 124 to render a SIP service. For example, SIP client application 502 may use SIP user credentials 506 received from SIP credentials server device 124 to authenticate the user at router/firewall device 204. Upon a successful user authentication, router/firewall device 204 may allow SIP client application 502 to communicate with another SIP client application in network 200.

During its configuration or during its operation, SIP client application 502 may increase the security of SIP user credentials by holding SIP user credentials 506 in memory 406. Because SIP user credentials 506 is in the memory space of SIP client application 502, SIP user credentials 506 may vanish from memory 406 when SIP client application 502 terminates (e.g., exits or is forced to shut down).

In some implementations, it is possible for the operating system on user device 122 to page out the portion of memory 406 used by SIP client application 502. This may result in SIP user credentials 506 being copied to storage unit 408. To prevent such an occurrence, in some implementations, SIP client application 502 may reconfigure the operating system (e.g., via changing the operating system parameters). This may prevent SIP user credentials 506 from being stored in storage unit 408.

In one implementation, once SIP user credentials 506 has been used (e.g., configuration, registration is complete), SIP client application 502 may overwrite the portion of memory 406 occupied by SIP user credentials 506. If the memory occupied by SIP client application 502 is copied to another portion of memory 406 (e.g., for memory management by the operating system), configuration information 506 would no longer be in memory 406, and thus, be inaccessible to another application (e.g., a virus) that received the memory previously occupied by SIP client application 502.

Browser 504 may include a web client, such as Internet Explorer, Firefox, Safari, etc., In some implementations, the user may obtain a copy of SIP client application 502 from client applications server device 214 via browser 504.

SIP user credentials 506 may include encrypted form of user credentials, including a user ID and a password. In some implementations, SIP user credentials 506 may be used for SIP registration. In other implementations, SIP user credentials 506 may be used to render a SIP service. Other uses of SIP user credentials 506 are possible.

Figure 6:
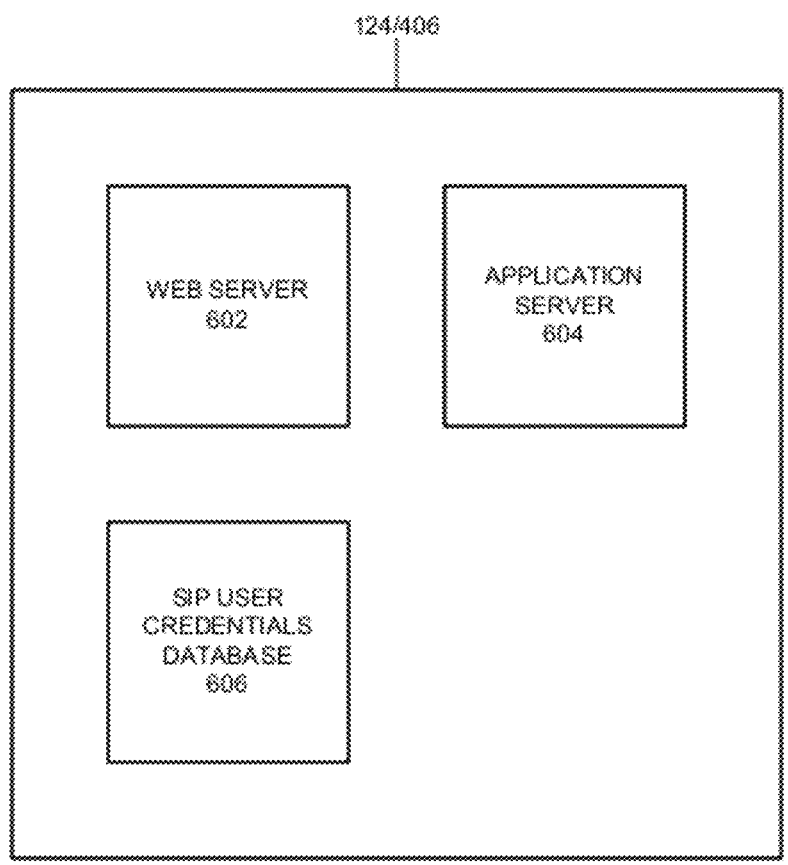
FIG. 6 is a block diagram of exemplary functional components of the Session Initiation Protocol (SIP) credentials server device of FIG. 2.

FIG. 6 is a block diagram of exemplary functional components of memory 406 in SIP credentials server device 124. As shown, memory 406 of SIP credentials server device 124 may include a web serve 602, application server 604, and SIP user credentials database 606.

Web server 602 may provide SIP user credentials and/or other types of information (e.g., SIP client application configuration information, documents, content, etc.) to user device 122 upon receiving a hypertext transfer protocol (HTTP) request from user device 122. The request may include user authentication information.

When web server 602 receives a request for SIP user credentials, web server 602 may fetch and send the SIP user credentials from SIP user credentials database 606. In other implementations, web server 602 may relay the request to application server 604. In these cases, application server 604 may serve the SIP user credentials to user device 122.

Application server 604 may provide services to user device 122. When application server 604 receives a request or notification from web server 602, application server 604 may provide an application for rendering the service (e.g., fetch SIP user credentials or configuration information) to browser 504. The application may be already in existence, or instantiated by application server 604. In some instances, application server 604 may retrieve and send SIP user credentials in SIP user credentials database 606.

SIP user credentials database 606 may include SIP user credentials for different user devices and/or applications (e.g., SIP client application 502). Upon receiving a particular identifier (e.g., user ID, account number for a user, product registration number, etc.), SIP user credentials database 606 may retrieve and return the corresponding SIP user credentials.

Figure 7:
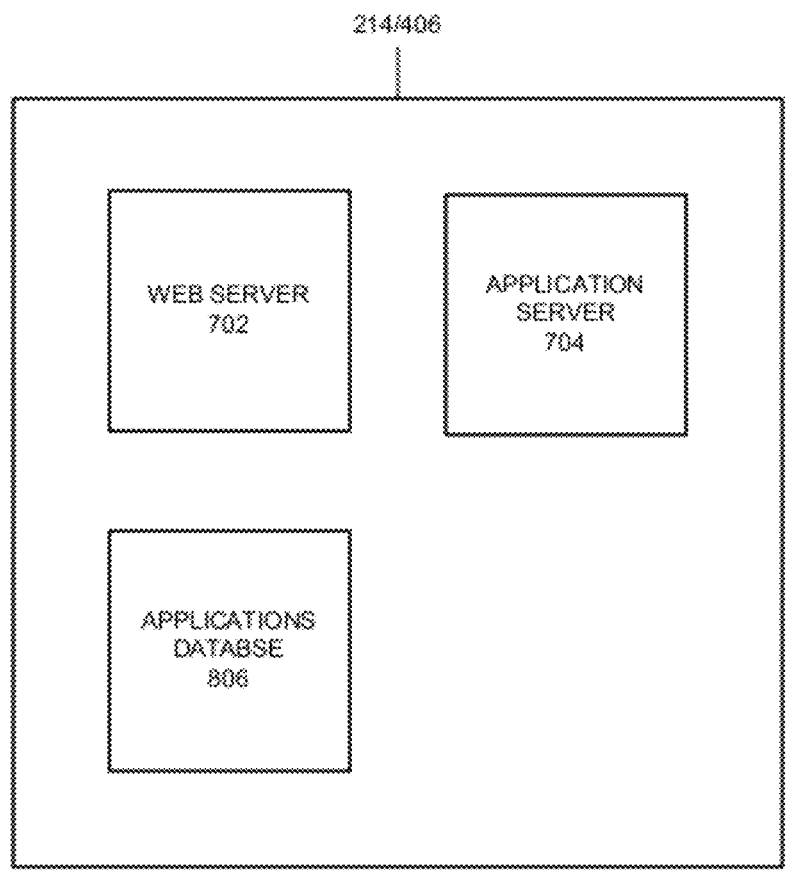
FIG. 7 is a block diagram of exemplary functional components of a client applications server device of FIG. 2.

FIG. 7 is a block diagram of exemplary functional component of client applications server device 214. As shown, client applications server device 214 may include a web server 702, application server 704, and applications database 706.

Web server 702 may provide a copy of a client application, such as a SIP client application 502 to user device 122 upon receiving a request for the client application. In some implementations, when web server 702 receives a request, web server 702 may fetch and send a copy of a client application from client applications database 706. In other implementations, web server 702 may relay the request to application server 704.

Application server 704 may provide services to user device 122. When application server 704 receives a request or notification from web server 702, application server 704 may provide an application for rendering the requested service (e.g., purchase a client application, allow a user to download a SIP client application based on the user's subscription, etc.) to browser 504. In some instances, application server 704 may retrieve and send a copy of SIP client application in client applications database 706.

Client applications database 706 may include client applications (e.g., SIP client application 502). Upon receiving a particular identifier or key (e.g., user ID, account number for a user, etc.), client applications database 706 may retrieve and respond with a copy of the corresponding client application. In some implementation, the fetched copy of a client application may not only include a copy of the client application, but also additional program/software component for installation, setting up the client application, configuring the client application, etc. The additional program/software component may be integral part of the client application, or a separate program/software component.

In FIG. 5-7, the functional components of FIGS. 5, 6, and 7 are exemplary. Depending on the implementation, memory 406 in each of user device 122, SIP credentials server device 124, and client applications server device 214 may include additional, fewer, or different components than those illustrated in FIGS. 5-7. Furthermore, although not shown in FIGS. 5-7 for simplicity, memory 406 in each of devices 122, 124, and 214 may include additional components, such as an operating system (e.g., Windows™, Linux, MacOS™, etc.), email application, album program, etc.

Figure 8:
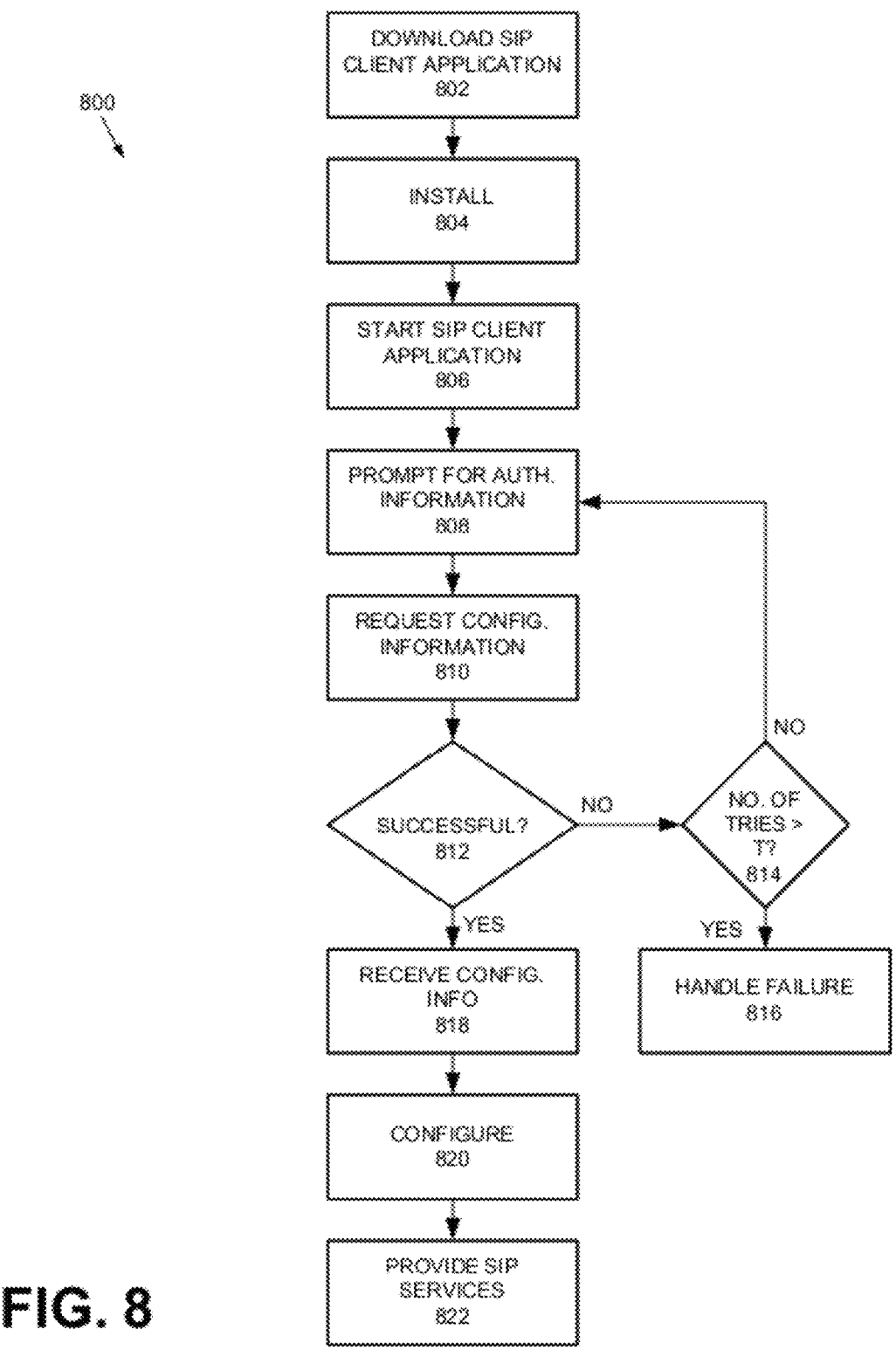
FIG. 8 is a flow diagram of an exemplary process that illustrates secure management of SIP user credentials.

FIG. 8 is a flow diagram of an exemplary process 800 illustrating secure management of SIP user credentials 506. Process 800 relates to configuration of SIP client application 502. Assume that browser 504 on user device 122 has sent a request for a copy of SIP client application to client applications server device 214.

User device 122 may download SIP client application 502 (block 802). In response to the user request, client applications server device 214 fetch a copy of SIP client application 502 and hand off the copy to browser 504 on user device 122.

User device 122 may install SIP received client application 502 (block 804). For example, when the user activates (e.g., via a touch on a touch screen of user device 122 or a mouse click) a setup icon on user device 122 or when SIP client application 502 has finished downloading, SIP client application 502 (or another software component) may initiate its installation. During the installation, SIP client application 502 may interact with the user (e.g., via screen input) to receive parameters that are needed for the setup.

User device 122 may start SIP client application 502 (block 806). For example, when the user activates a SIP client application icon (or a configuration icon), user device 122 may start SIP client application 502 or another software component (herein referred to as SIP client application 502 for simplicity).

SIP client application 502 may prompt the user for authentication information (block 808). Upon receiving a user ID and a password, SIP client application 502 may request configuration information at SIP credentials server device 124 (block 810). In requesting the information, SIP client application 502 may authenticate the user at SIP credentials server device 124 (block 812). In addition, SIP client application 502 may provide additional information, such as an identifier or a product code, user account number (e.g., subscriber account number), etc. to SIP credentials server device 124.

If the authentication is unsuccessful (block 812: no), SIP client application 502 may proceed to block 814, to determine whether the number of tries at authentication is greater than a threshold T. (block 814). If the number of attempts is not greater than the threshold T (block 814: no), SIP client application 502 may return to block 806. Otherwise (block 814: yes), SIP client application 502 may handle the authentication failure (block 816) (e.g., exit the configuration process, send a notification to a service provider, etc.).

If the authentication is successful (block 812: yes), SIP client application 502 may receive the configuration information from SIP credentials server device 124 over a secure channel (block 818). The configuration information may be in an encrypted form, and SIP client application 502 may decrypt the information. SIP client application 502 may place either the encrypted or decrypted information in memory 406.

Using the decrypted information, SIP client application 502 may configure or complete the configuration of SIP client application 502 (block 820). This may include using SIP user credentials included in the configuration information to perform the SIP registration, at registration device 210. During the configuration, as described above with respect to FIGS. 5-7, SIP client application 502 may perform additional operations (e.g., reconfigure the operating system) to ensure that SIP user credentials 506 (encrypted or decrypted) is not copied to storage unit 408.

Once the configuration is complete, SIP client application 502 on user device 122 may render SIP services (block 822) (e.g., receive/place a SIP VoIP call, send a SIP text message, etc.). In some instances, SIP client application 406 may repeat the registration process that requires the SIP user credentials. In such instances, user device 122 and/or SIP client application 506 may repeat portions of process 800 (e.g., blocks 808 through 820).

Figure 9:
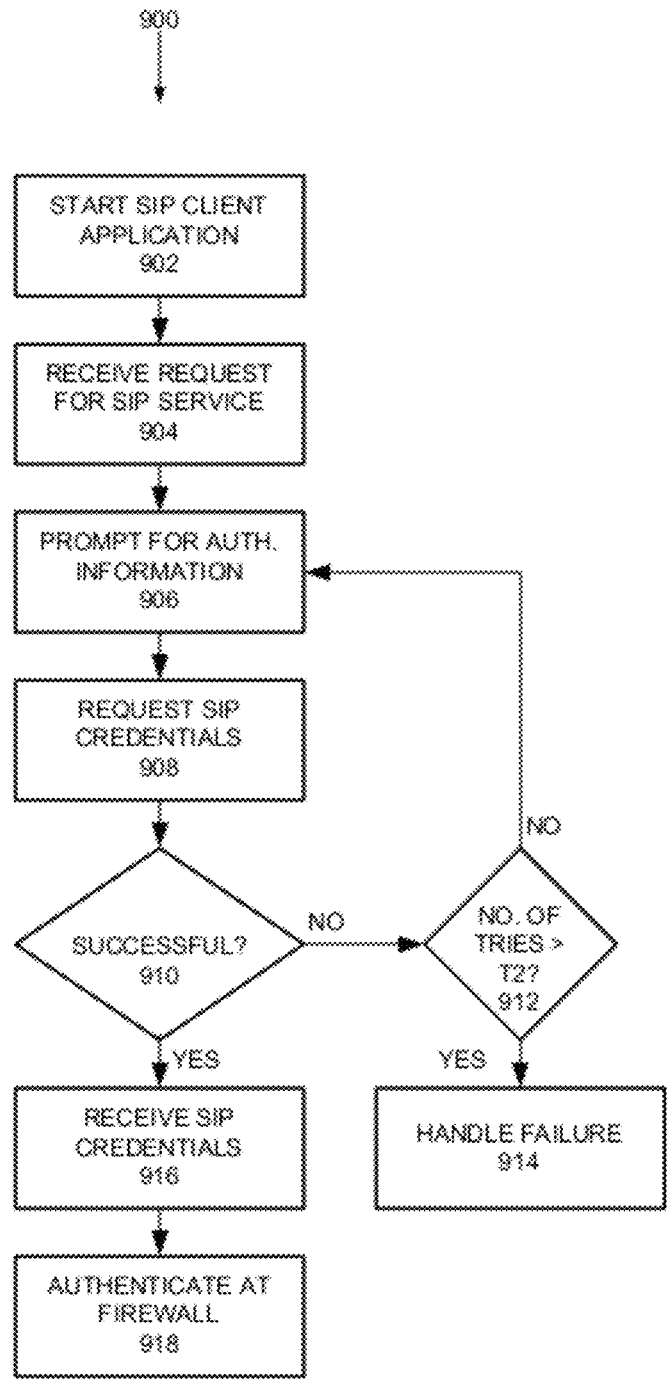
FIG. 9 is a flow diagram of another exemplary process that illustrates the secure management of SIP user credentials.

FIG. 9 is a flow diagram of another exemplary process 900 that illustrates the secure management of SIP user credentials 506. Process 900 relates to rendering SIP services. Assume that SIP client application 502 has been configured.

SIP client application 502 may be started (block 902). As described at block 804 of process 800, user device 122 may start SIP client application upon receiving appropriate user input.

SIP client application 502 may receive a request for a SIP service (block 904). For example, via a user interface, SIP client application 502 may receive a request to place a VoIP phone call to user device 202, initiate a instant messaging, etc.

SIP client application 502 may prompt the user for a user ID and a password (block 906). Upon receipt of the user ID and the password, SIP client application 502 may send a request for SIP user credentials to SIP credentials server device 124 (block 908). In requesting the information, SIP client application 502 may authenticate the user at SIP credentials server device 124 using the user ID and the password (block 908). In some implementations, SIP client application 502 may provide information in addition to the user ID and the password, such as an identifier or a product code, user account number, etc. to SIP credentials server device 124.

If the authentication is unsuccessful (block 910: no), SIP client application 502 may proceed to block 912, to determine whether the number of tries at authentication is greater than a threshold. T2 (block 912). If the number of attempts is not greater than T2 (block 914: no), SIP client application 502 may return to block 906. Otherwise (block 912: yes), SIP client application 502 may handle the authentication failure (block 914).

If the authentication is successful (block 910: yes), SIP client application 502 may receive the SIP user credentials from SIP credentials server device 124 over a secure channel (block 916). The SIP credentials may be in an encrypted form. SIP client application 502 may decrypt the information, and use the SIP credentials for authentication at router/firewall device 204-1 (block 918). Thereafter, SIP client application 502 may provide the SIP service requested at block 904.

In some implementations, in process 900, SIP client application 502 may perform operations similar to those in process 800 to ensure that SIP user credentials 506 are not copied to storage unit 408. For example, SIP client application 502 may remove SIP user credentials 506 from memory 406 once the SIP service has been rendered. In addition, SIP client application 502 may not commit the SIP user credentials (encrypted or decrypted) to storage unit 408. These operations may provide additional safeguards to user device 122 against hacking or tampering.

In the description above, user device 122/SIP client application 502 provides for secure management of SIP user credentials. SIP user credentials 506 are stored in memory 406 and not in storage 408. Accordingly, if user device 122 shuts off, or if SIP client application 502 exits, quits, or is terminated, SIP user credentials 506 vanish from user device 122. This provides for increased security.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to the process illustrated in FIGS. 8 and 9, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   prompting, by a user device, a user for a user identifier (ID) and a password via a user interface;
   receiving the user ID and the password via the user interface;
   sending a request for information to a server device, the request including the user ID and the password;
   receiving the information, over a secure channel, from the server device after the server device successfully authenticates the user based on the user ID and the password;
   decrypting the information;
   storing, in a memory of the user device either the information or the decrypted information;
   preventing, by the user device, when the user device is running a program installed on a non-volatile storage unit of the user device, storing, on the non-volatile storage unit of the user device, either the information or the decrypted information, wherein the program includes a browser or a client application, wherein the preventing includes:
   configuring an operating system installed on the non-volatile storage unit of the user device to prevent, when the operating system is running, the operating system from copying, to the non-volatile storage unit, the information or the decrypted information after using the decrypted information; and
   using, by the user device, the decrypted information to authenticate, at a network device, the user.

2. The method of claim 1, further comprising:
   downloading the client application from a client applications server device;
   installing the client application on the user device;
   launching the client application at the user device; and
   configuring, by the client application, and causing the user device to prompt the user for the user ID and the password.

3. The method of claim 1, wherein using the decrypted information includes:
   using session initiation protocol credentials included in the decrypted information to authenticate, at the network device, the user.

4. The method of claim 3, wherein using the session initiation protocol credentials includes:
   using the session initiation protocol credentials included in the decrypted information to register the user at a session initiation protocol registration device.

5. The method of claim 1, further comprising:
   receiving a request from the user to provide a session initiation protocol-based service.

6. The method of claim 5, wherein receiving the request from the user to provide the session initiation protocol-based service includes:
   receiving a request from the user to place a voice-over-Internet Protocol call to another user device.

7. The method of claim 1, further comprising:
   erasing a portion, of the memory, that includes the decrypted information after using the decrypted information.

8. The method of claim 1, wherein decrypting the information includes:
   using a rotating key to decrypt the information.

9. The method of claim 1, wherein receiving the information includes:
    receiving network identifiers or addresses that are associated with a session initiation protocol server device, a session initiation protocol proxy server device, or a firewall device.

10. A device comprising:
    a non-volatile storage unit to store a client application or a browser;
    a memory to store data;
    a network interface to communicate with devices over a network; and
    one or more processors to run the client application or the browser to:
        prompt a user for a user identifier (ID) and a password via a user interface;
        receive the user ID and the password via the user interface;
        send a request for information to a server device on the network, the request including the user ID and the password;
        receive the information, over a secure channel, from the server device after the server device successfully authenticates the user based on the user ID and the password;
        decrypt the information;
        store, in the memory, either the information or the decrypted information;
        prevent from storing, on the non-volatile storage unit, either the information or the decrypted information, wherein when preventing, the one or more processors are to:
            configure an operating system installed on the non-volatile storage unit to prevent, when the operating system is running, the operating system from copying, to the non-volatile storage unit, the information or the decrypted information after using the decrypted information; and
        use the decrypted information to authenticate the user at a network device.

11. The device of claim 10, wherein the information includes session initiation protocol user credentials.

12. The device of claim 10, wherein the device includes:
    a tablet computer, a cellular telephone, a laptop computer, a personal computer, or a game console.

13. The device of claim 10, wherein the information includes:
    client application configuration information.

14. The device of claim 10, wherein the one or more processors are further configured to:
    receive a request from the user to initiate a session initiation protocol-based service.

15. The device of claim 14, wherein the session initiation protocol-based service includes one of: an instant text messaging service or a voice-over-Internet Protocol service.

16. The device of claim 10, wherein the one or more processors are further configured to use a rotating key to decrypt the information.

17. The device of claim 10, wherein the network device includes one of:
    a session initiation protocol registration server device; or
    a firewall device.

18. The device of claim 10, wherein the one or more processors are further configured to erase the information on a portion of the memory after using the information.

19. A computer-readable storage device, comprising machine-executable instructions, the machine-executable instructions for causing one or more processors executing the machine-executable instructions to:
    request from a user at a user device that includes the one or more processors and a non-volatile storage unit, a user identifier (ID) and a password, wherein a program that includes the machine-executable instructions is installed on the non-volatile storage unit of the user device;
    receive the user ID and the password;
    send a request, from the user device, for session initiation protocol user credentials to a server device, the request including the user ID and the password;
    receive, at the user device, the session initiation protocol user credentials, over a secure channel, from the server device after the server device successfully authenticates the user based on the user ID and the password;
    decrypt the session initiation protocol user credentials;
    store, in a memory of the user device, the session initiation protocol user credentials;
    prevent from storing, on the non-volatile storage unit, the session initiation protocol user credentials, wherein when preventing, the one or more processors are to:
        configure an operating system installed on the non-volatile storage unit to prevent, when the operating system is running, the operating system from copying, to the non-volatile storage unit, the session initiation protocol user credentials; and
    authenticate the user based on the session initiation protocol user credentials at a session initiation protocol registration server device.

* * * * *